United States Patent [15] 3,694,668

Foerster [45] Sept. 26, 1972

[54] TRACK AND HOLD SYSTEM

[72] Inventor: Roy P. Foerster, Thousand Oaks, Calif.

[73] Assignee: The Bunker-Ramo Corporation, Oak Brook, Ill.

[22] Filed: Jan. 2, 1970

[21] Appl. No.: 84

[52] U.S. Cl. ......................307/235, 328/151, 320/1, 340/200

[51] Int. Cl. ............................................H03k 5/08

[58] Field of Search......340/177, 186, 187, 200, 201, 340/211; 330/23, 30; 328/151; 307/235, 246; 320/1

[56] References Cited

UNITED STATES PATENTS

| | | | |
|---|---|---|---|
| 2,900,607 | 8/1959 | Barabutes et al. | 340/186 |
| 3,452,289 | 6/1969 | Ryan | 330/30 |
| 3,503,049 | 3/1970 | Gilbert et al | 328/151 |
| 3,506,922 | 4/1970 | Hannauer et al. | 328/151 |
| 3,543,169 | 11/1970 | Hill | 328/151 |

*Primary Examiner*—John W. Caldwell
*Assistant Examiner*—Marshall M. Curtis
*Attorney*—Frederick M. Arbuckle

[57] ABSTRACT

A system for enabling a capacitor to track an analog input signal and hold the signal level, on command. The system includes a high speed operation amplifier having first and second independent and selectable pairs of differential inputs. The amplifier output is connected through a pair of diodes connected in inverse parallel to the capacitor. Feedback means couple the capacitor to one pair of inputs in the track mode in a manner such that the high amplifier gain compensates for nonlinearities and offset effects to enable the capacitor to precisely track the input signal. In the hold mode, the other pair of inputs is selected to enable the amplifier to act as a unity gain voltage follower providing an output substantially equal to the capacitor voltage and insufficient to exceed the forward threshold of the diodes.

9 Claims, 4 Drawing Figures

INVENTOR.
ROY P. FOERSTER
BY Lindenberg & Freilich
ATTORNEYS

INVENTOR
ROY P. FOERSTER
BY Lindenberg + Freilich
ATTORNEYS

TRACK AND HOLD SYSTEM

BACKGROUND OF THE INVENTION

This invention relates to systems generally characterized as sample and hold systems, although more accurately referred to as track and hold systems. Such systems are widely used in data handling systems to temporarily freeze a varying analog input signal in response to a hold command. That is, at some point in time, a command signal causes the system to output a constant voltage equal to the level of the analog input voltage at that time. Such track and hold systems are useful, for example, to couple an analog input signal to a processing circuit such as an analog-to-digital converter which may require that the input signal level applied thereto not change during a conversion cycle.

Most state of the art track and hold systems operate on a common principle and generally employ an operational amplifier in conjunction with a storage capacitor and a switching means to enable the capacitor voltage to track the analog input signal. Upon receiving the hold command, the switching means disconnects the storage capacitor from the analog input signal and the stored voltage is read out through the amplifier at the held level. In low speed units, the major problem is to keep any discharge current, flowing to the capacitor, low so that a long storage interval may be obtained. At high speeds, a different type of problem is encountered. That is, at high speeds, the required storage time of the amplifier is usually fairly short so the discharge current to the capacitor is not usually critical. The critical problem is to drive the capacitor at very high speeds, so that it tracks the analog input signal accurately, and then disconnect the capacitor, upon command without introducing any error into the capacitor.

Although satisfactory operational amplifiers are now readily available for driving the capacitor at very high speeds to enable it to track, considerable difficulty has been encountered in developing a suitable switch for disconnecting the capacitor without introducing an error into it. Attempts have been made to utilize field effect transistors for this purpose. However, they have been found to be unsatisfactory because they exhibit a large nonlinear and temperature sensitive shunt capacitance. This capacitance acts to couple the hold command signal to the storage capacitor, which is normally not very large, thus injecting an error into the held voltage. Even if compensating techniques are employed, it has not been possible to achieve sufficiently high accuracies and high speeds using field effect transistor switches for the subject switching application.

SUMMARY OF THE INVENTION

An object of the present invention is to provide an improved track and hold system capable of accurately operating at very high speeds.

In accordance with the present invention, when in the track mode, a capacitor is driven through a nonlinear current path by an amplifier whose gain is sufficiently high to effectively remove the nonlinearity of the path. The path is, however, sufficiently nonlinear at its center that when the voltage across it is low, there is no current through the path. In the hold mode, a unity gain voltage follower is formed to establish this low voltage condition and thereby isolate the capacitor from the analog input voltage. Transition from the track mode to the hold mode is achieved without requiring the interruption of any currents and without introducing any error into the voltage held by the capacitor.

In accordance with the preferred embodiment of the invention, a track and hold system is provided in which the output of a switching operational amplifier is coupled to a capacitor through a pair of diodes connected in inverse parallel. The amplifier has first and second independent and selectable pairs of differential inputs. A feedback path active during the track mode couples the capacitor to the first pair of inputs to merely form an inverting amplifier whose gain is determined by the ratio of the feedback resistors. The gain is made high enough so that nonlinearity and offset effects of the diodes are removed and the amplifier provides an output signal to the capacitor that precisely tracks the input signal.

In the hold mode, the second pair of amplifier differential inputs is coupled to the capacitor to form a unity gain voltage follower providing an output substantially equal to the capacitor voltage. In this configuration, the voltage applied across the diodes will be below their forward threshold, therefore effectively disconnecting the capacitor from the voltage input thus permitting the capacitor to hold its charge for the full hold interval.

In accordance with the preferred embodiment of the switching operational amplifier, a pair of differential input circuits is used each comprised of a differentially connected transistor pair. When in the track mode, the first differential input circuit is selected by applying an enabling potential to the emitters thereof and effectively opening the emitter circuits of the second differential input circuit. When in the hold mode, the second differential input circuit is activated by opening the emitter circuits of the first differential input circuit and applying an enabling potential to the emitters of the second differential input circuit.

Transition from the track mode to the hold mode is accomplished without having to actually disconnect the capacitor, i.e., without having to actually interrupt any currents. Rather, currents are simply forced to go to a null state. As a result of this circuit operation, the amplifier is always active and in a linear condition. It remains so even during the switching between modes because, internally, the effect of selecting a different input pair is comparable to turning down the gain of one input and turning up the gain of the other simultaneously. This assures a transient free transition between modes.

DESCRIPTION OF A PREFERRED EMBODIMENT

Figure 1:
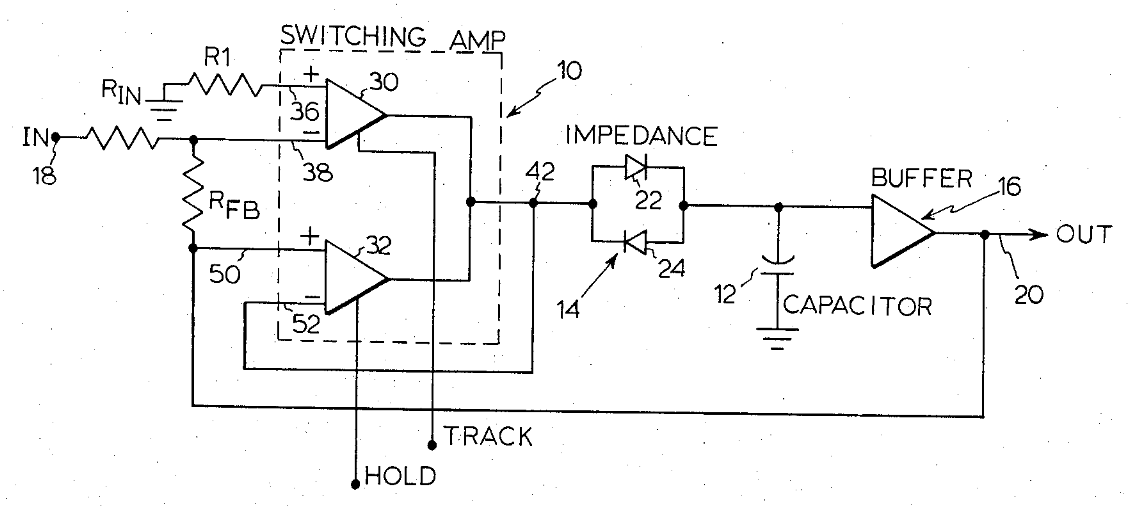
FIG. 1 is a block diagram of a track and hold system in accordance with the present invention.

Attention is now called to FIG. 1 of the drawings which illustrates a block diagram of a track and hold system in accordance with the present invention. The system of FIG. 1 includes a switching amplifier 10 coupled to a storage capacitor 12 through a nonlinear impedance means 14. A buffer amplifier 16 is preferably provided to isolate the storage capacitor 12 from the output load and feedback network to be discussed.

As previously indicated, the system of FIG. 1 is intended to selectively operate in either of two modes; namely, a track mode and a hold mode. In the track mode, the voltage across the capacitor 12 is intended to precisely follow or track the voltage signal applied to the system input terminal 18. In response to a hold command, the system is switched from the track operational mode to the hold operational mode to freeze the capacitor voltage and provide a signal at the system output terminal 20 equal to the level of the input signal at the time of the hold command.

Figure 2A:
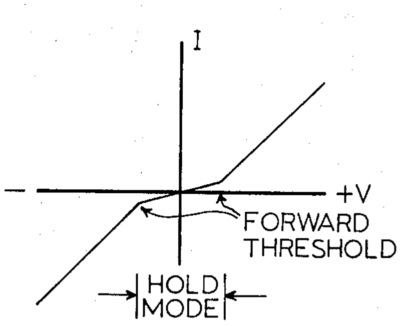
FIG. 2*a* is a diagram illustrating the nonlinear characteristic of the diodes of FIG. 1.
Figure 2B:
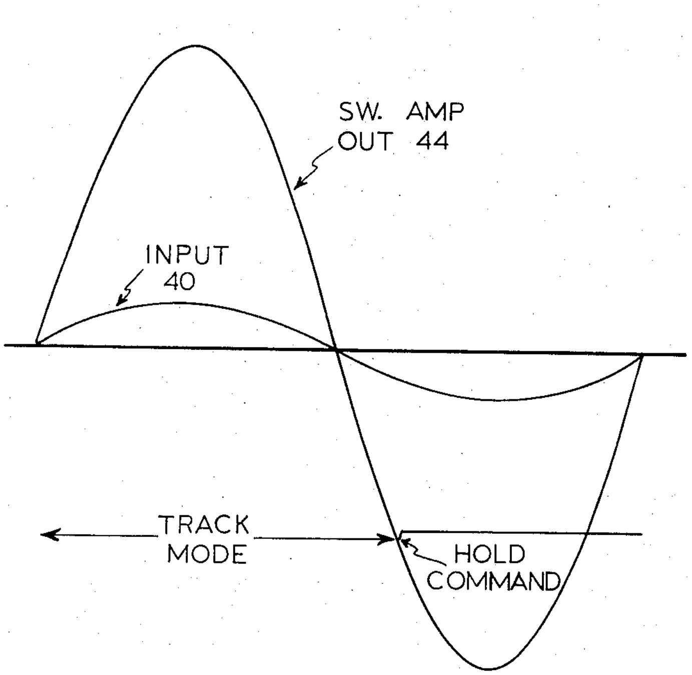
FIG. 2*b* is a diagram illustrating waveforms occurring within the system of FIG. 1.

In accordance with the present invention, the nonlinear impedance means 14 acts as a high speed switch which, in the track mode, enables the capacitor voltage to precisely track the input voltage but which, in the hold mode, effectively isolates the capacitor from the input terminal 18. The nonlinear impedance means 14 preferably comprises a pair of diodes 22 and 24 connected in inverse parallel, as illustrated. The diodes can comprise conventional silicon diodes which exhibit a forward threshold of several hundred millivolts. The current-voltage characteristic of the diodes is illustrated in FIG. 2(*a*). It will be recognized that if the voltage applied across the diodes is kept below the forward threshold value, then the current flow through the diodes will be quite negligible. This characteristic of the diode is utilized, in accordance with the present invention, to disconnect the capacitor 12 from the input terminal during the hold mode. That is, in the hold mode the forward voltage across the diodes 22 and 24 is forced essentially to zero to thereby isolate the capacitor 12 from the input terminal 18.

The switching amplifier 10 can be considered as having first and second input amplifiers 30 and 32 and a common output circuit. The amplifier 30 is active during the track operational mode and the amplifier 32 is active during the hold operational mode. As will be discussed hereinafter in greater detail in conjunction with FIG. 3, each of the amplifiers 30 and 32 constitutes a differential amplifier having first and second input terminals. In the track mode, the amplifier 30 is active to exhibit a high inverse gain to the input signal to thus mask out the nonlinearities introduced by the impedance means 14 and therefore enable the capacitor 12 to precisely track the input signal. In the hold mode, the amplifier 32 is active to exhibit an inverse unity gain to the potential developed across the impedance means 14 to thereby force the potential across the impedance means to essentially zero. In switching between the operational modes, no currents are interrupted within the switching amplifier 10 and as a consequence no transients are generated which might introduce errors into the capacitor voltage. Rather, transition from one mode to the other is effected by essentially decreasing the gain on one input channel of the switching amplifier 10 while simultaneously increasing the gain of the other.

Input amplifier 30 is provided with first and second input terminals 36 and 38. Input terminal 36 is connected through resistor R1 to a source of reference potential, illustrated as ground. Input terminal 38 is connected through input resistor $R_{IN}$ to the system input terminal 18. In addition, the system output terminal 20 is fed back through feedback resistor $R_{FB}$ to amplifier input terminal 38. When operating in the track mode, the inverse gain exhibited by the amplifier 30 is determined by the ratio of the feedback resistance $R_{FB}$ to the input resistance $R_{IN}$. In accordance with the present invention, this gain is made sufficiently high so as to mask out the nonlinearities introduced by impedance means 14 and enable the capacitor to precisely track the input signal. More particularly, attention is called to FIG. 2(*b*) which illustrates a typical input signal 40 applied to input terminal 18. During the track mode, the signal at the output terminal 42 of the switching amplifier 10 will very closely follow the input signal 40, as represented by the waveform 44 in FIG. 2(*b*).

In response to a hold command, the amplifier 30 will be deactivated while the amplifier 32 will be activated. Amplifier 32 has input terminals 50 and 52 which are essentially connected across the impedance means 14. More particularly, the system output terminal 20 is coupled directly to input terminal 50 of amplifier 32 while the switching amplifier output terminal 42 is coupled directly to the input terminal 52 of amplifier 32. Amplifier 32 exhibits an inverse unity gain which thus tends to reduce any voltage across the impedance means 14 toward zero. As a consequence, in the hold mode, the potential applied across the impedance means 14 will always be below the forward threshold of the diode as represented in FIG. 2(*a*) thus effectively isolating the capacitor 12 from the input terminal 18.

Figure 3:
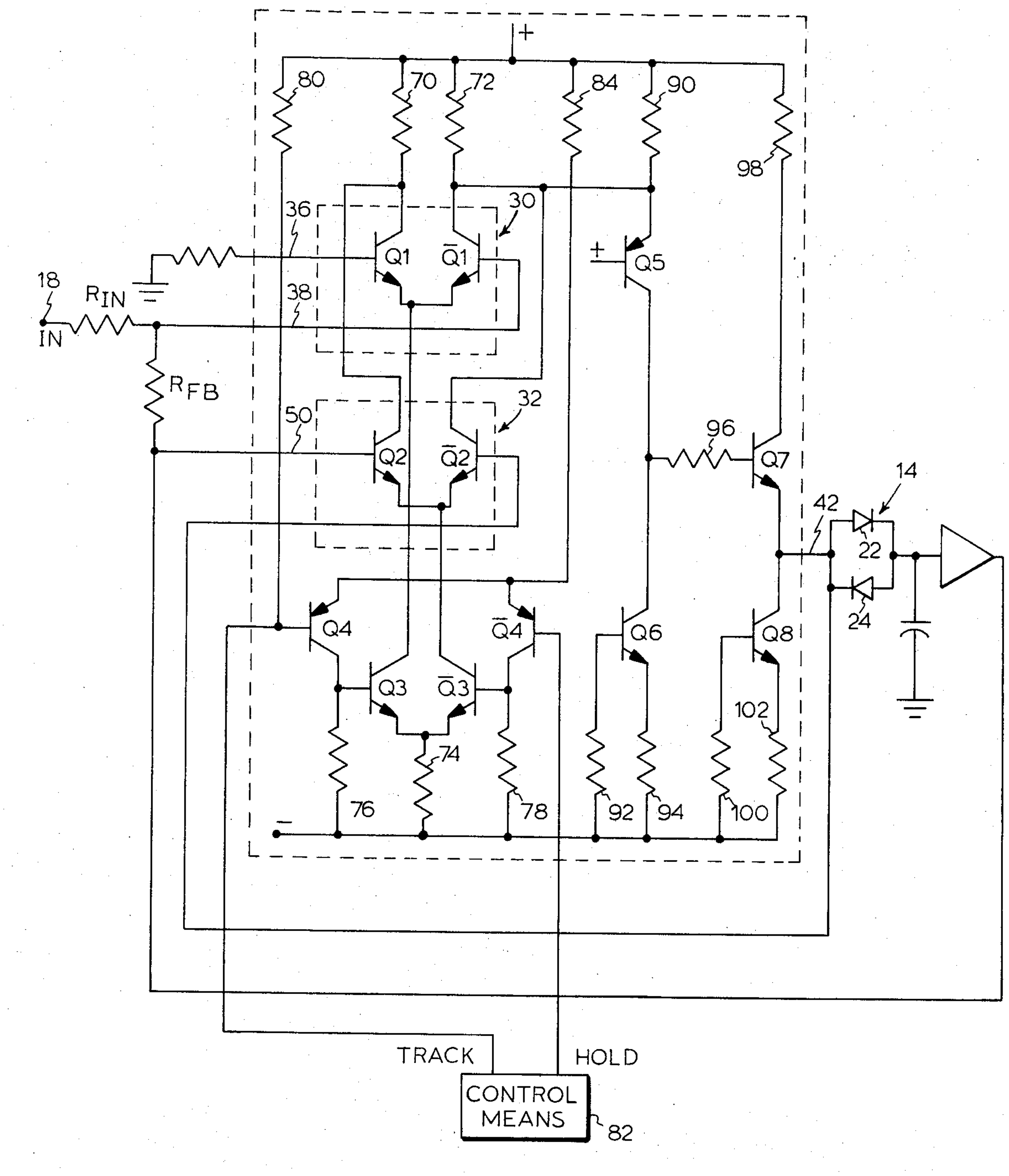
FIG. 3 is a schematic diagram of the track and hold system of FIG. 1 illustrating the switching amplifier in greater detail.

Attention is now called to FIG. 3 which illustrates the system of FIG. 1, and particularly the switching amplifier 10, in greater detail. The input amplifier 30 consists of a pair of differentially connected NPN transistors Q1 and $\overline{Q1}$. The collector of transistor Q1 is connected through resistor 70 to a source of positive potential. Similarly, the collector of transistor $\overline{Q1}$ is connected through a resistor 72 to the same source of positive potential. The bases of transistors Q1 and $\overline{Q1}$ are respectively connected to the input terminals 36 and 38 previously discussed. The emitters of the transistors Q1 and $\overline{Q1}$ are connected in common and to the collector of an NPN transistor Q3 to be discussed hereinafter.

Input amplifier 32 similarly consists of a pair of NPN transistors Q2 and $\overline{Q2}$. The collectors of transistors Q2 and $\overline{Q2}$ are respectively connected to the collectors of transistors Q1 and $\overline{Q1}$. The bases of transistors Q2 and $\overline{Q2}$ are respectively connected to the input terminals 50 and 52 previously discussed. The emitters of transistors Q2 and $\overline{Q2}$ are connected in common and to the collector of transistor $\overline{Q3}$. Transistors Q3 and $\overline{Q3}$ form a differential pair whose emitters are connected in common and through a resistor 74 to a source of negative potential. The bases of transistors Q3 and $\overline{Q3}$ are in turn respectively connected to the collectors of transistors Q4 and $\overline{Q4}$, which comprise PNP transistors. Resistors 76 and 78 respectively connect the collectors of transistors Q4 and $\overline{Q4}$ to the source of negative potential. The base of transistor Q4 is connected through resistor 80 to the source of positive potential. The base of transistor $\overline{Q}4$ is connected to the hold output terminal of a control means 82 which selectively defines the hold and track modes. The emitters of transistors Q4 and $\overline{Q}4$ are connected in common and through a resistor 84 to the source of positive potential.

The collectors of transistors $\overline{Q}1$ and $\overline{Q}2$ are connected in common to the emitter PNP transistor Q5 which forms part of the switching amplifier output circuit. The emitter of transistor Q5 is connected through resistor 90 to the source of positive potential. The base of transistor Q5 is connected to a positive reference potential to form a cascade connection meaning that the emitter of transistor Q5 is effectively tied to a fixed potential. Thus, the potential across resistor 90 will be essentially fixed and the current therethrough will be constant. The current flowing in the emitter-collector path of transistor Q5 will therefore depend upon how much current is drawn from resistor 90 by transistors Q1 and $\overline{Q}1$.

The collector of transistor Q5 is connected to the collector of transistor Q6 which is connected as a constant current load. More particularly, the base and emitter of transistor Q6 are respectively connected through resistors 92 and 94 to the source of negative potential. Thus the transistor Q6 appears substantially as an infinite impedance to the collector of transistor Q5 and any current change through the collector of transistor Q5 will produce a large voltage swing which will be coupled through resistor 96 to the base of NPN transistor Q7. The collector of transistor Q7 is connected through resistor 98 to the source of positive potential. The emitter of transistor Q7 is coupled to the collector of transistor Q8 which also is connected as a constant current load in that the base and emitter thereof are respectively connected through resistors 100 and 102 to the source of negative potential. The emitter of transistor Q7 is connected to the previously referred to amplifier output terminal 42. As a consequence of transistor Q8 being connected as a constant current load, any current change through the emitter of transistor Q7 will produce a large voltage swing at the output terminal 42, which it will be recalled, is coupled to the impedance means 14.

In the operation of the switching amplifier of FIG. 3, assume initially that the control means 82 defines the track mode. This will bias the transistor Q4 on and the transistor $\overline{Q}4$ off. This in turn, will forward bias transistor Q3 and off-bias transistor $\overline{Q}3$. As a consequence, the emitters of transistors Q1 and $\overline{Q}1$ will be coupled through transistor Q3 and resistor 74 to the source of negative potential thereby enabling the amplifier 30. The input signal applied to input terminal 18 will then determine the current drawn by transistor $\overline{Q}1$ from resistor 90. For example, as the input voltage level becomes more positive, transistor $\overline{Q}1$ will draw greater current thereby reducing the current through the emitter-collector path of transistor Q5, thus swinging the collector thereof negative to in turn reduce the current through the collector-emitter path of transistor Q7 to swing the output terminal 42 negative. On the other hand, a negative swing of the analog input signal applied to terminal 18 will produce a positive swing at the output terminal 42.

When the control means 82 switches from the track to the hold mode, transistor $\overline{Q}4$ will become forward biased thus off-biasing transistor Q4. As a consequence, transistor $\overline{Q}3$ will become forward biased and off-bias transistor Q3. This action will activate input amplifier 32 and deactivate input amplifier 30. As will be recalled, the input to amplifier 32 is taken from across the impedance means 14. As a consequence of the inverting nature of the amplifier, the input signal applied across the terminals 50 and 52 will produce an opposite polarity signal at the output terminal 42 thus tending to reduce the potential across the impedance means 14 to zero. Accordingly, in the hold mode the potential across the diodes 22 and 24 of the impedance means will be held below their forward threshold to thereby isolate the capacitor 12.

From the foregoing, it will be recognized that a track and hold system has been disclosed herein in which a storage capacitor can be controlled so as to either track or hold an applied analog input signal. Control is accomplished by a switching amplifier having a pair of input channels and a common output circuit. In the track mode the switching amplifier exhibits a high gain to mask the nonlinear impedance of an impedance means coupling the switching amplifier to the capacitor. In the hold mode, the switching amplifier forces the potential across the impedance means to a level below the forward threshold of the impedance means to thereby essentially reduce any current therethrough to zero. Transition from the track mode to the hold mode is achieved without requiring the interruption of any currents and thus without introducing any error into the voltage held by the capacitor. Rather than interrupting any currents, currents are simply forced to a null state. As a result of this circuit operation, the amplifier is always active and in a linear condition. It remains so even during the transition between modes because, internally, the effect of selecting a different input amplifier is comparable to turning down the gain of one input channel and turning up the gain of the other simultaneously. This assures a transient free transition between modes.

The embodiments of the invention in which an exclusive property or privilege is claimed are defined as follows:

1. Apparatus, useful in combination with a capacitor, for operating in a track mode to enable said capacitor to track an analog input signal and a hold mode to enable said capacitor to hold the level of said input signal constant upon the initiation of said hold mode, said apparatus comprising:

impedance means adapted to be connected to said capacitor, said impedance means having a nonlinear characteristic such that the current through it is essentially zero when the voltage across it is below a certain threshold and increases substantially linearly as the voltage increases from said threshold;

amplifier means including means active during said track mode and responsive to said input signal for exhibiting a relatively high inverse gain and means active during said hold mode and responsive to the voltage across said impedance means for exhibiting a unity inverse gain; and responsive to the output voltage of said impedance means and coupling said impedance means to said amplifier means so that during said track mode said relatively high inverse gain exhibited by said amplifier means causes the voltage across said impedance means to be above said threshold to permit said capacitor to track said input signal, and so that during said hold mode said unity inverse gain exhibited by said amplifier means causes the voltage across said impedance means to be below said threshold so as to isolate said capacitor from said input signal and hold the voltage existing thereon.

2. A system for tracking an analog input signal and for storing the input signal level on command, said system comprising:

a storage capacitor;

impedance means connected to said capacitor, said impedance means having a nonlinear characteristic such that the current through it is essentially zero when the voltage across it is below a certain threshold and increases substantially linearly as the voltage increases from said threshold;

amplifier means selectively operable in either a track mode or a hold mode and active during said track mode and responsive to said input signal for exhibiting a relatively high inverse gain and active during said hold mode and responsive to the voltage across said impedance means for exhibiting a unity inverse gain; and responsive to the output voltage of said impedance means and coupling said impedance means to said amplifier means so that during said track mode said relatively high inverse gain exhibited by the voltage across said amplifier means causes said impedance means to be above said threshold to permit said capacitor to track said input signal, and so that during said hold mode said unity inverse gain exhibited by said amplifier means causes the voltage across said impedance means to be below said threshold so as to isolate said capacitor from said input signal and hold the voltage existing thereon.

3. The system of claim 2 wherein said impedance means comprises first and second diodes connected in inverse parallel.

4. The system of claim 2 wherein said amplifier means includes first and second differential input circuits and a common output circuit, said first input circuit having first and second input terminals and said second input circuit having third and fourth input terminals;

means responsive to said track mode being defined for enabling said first input circuit and to said hold mode being defined for enabling said second input circuit.

5. The system of claim 4 including means connecting said first input terminal to a source of reference potential; and input resistor means for coupling said input signal to said second input terminal and feedback resistor means for coupling the junction between said capacitor and said impedance means to said second input terminal.

6. The system of claim 4 including means for coupling the junction between said capacitor and said impedance means to said third input terminal and for coupling said output of said amplifier means to said fourth input terminal.

7. The system of claim 4 including means connecting said first input terminal to a source of reference potential;

input resistor means for coupling said input signal to said second input terminal and feedback resistor means for coupling the junction between said capacitor and said impedance means to said second input terminal; and means for coupling the junction between said capacitor and said impedance means to said third input terminal and for coupling said output of said amplifier means to said fourth input terminal;

said impedance means comprising first and second diodes connected in inverse parallel.

8. The system of claim 4 wherein said first differential input circuit includes first and second transistors each having a base, a collector, and an emitter;

means connecting said first and second transistor bases to said first and second input terminals, respectively;

means connecting said first and second transistor emitters in common; and wherein said second differential input circuit includes third and fourth transistors each having a base, a collector, and an emitter;

means connecting said third and fourth transistor bases to said third and fourth input terminals, respectively;

means connecting said third and fourth transistor emitters in common; and means connecting said collectors of said first, second, third, and fourth transistors to a source of reference potential.

9. The system of claim 8 including a differential control circuit comprised of fifth and sixth transistors each having a base, a collector, and an emitter;

means coupling said fifth transistor base to said control means and said sixth transistor base to a source of reference potential;

means connecting said fifth and sixth transistor emitters in common and to a source of reference potential; and means coupling the common emitter connection of said first and second transistors to said fifth transistor collector and the common emitter connection of said third and fourth transistors to said sixth transistor collector.

* * * * *